(12) United States Patent
Lin

(10) Patent No.: US 9,506,290 B2
(45) Date of Patent: Nov. 29, 2016

(54) TENSION DEVICE FOR LOOPED-CORD SYSTEM

(75) Inventor: Tzong-Fu Lin, Taipei (TW)

(73) Assignee: Whole Space Industries LTD, Taipei (TW)

( * ) Notice: Subject to any disclaimer, the term of this patent is extended or adjusted under 35 U.S.C. 154(b) by 1263 days.

(21) Appl. No.: 13/273,606

(22) Filed: Oct. 14, 2011

(65) Prior Publication Data

US 2013/0091968 A1    Apr. 18, 2013

(51) Int. Cl.
| E06B 9/322 | (2006.01) |
| E06B 9/76 | (2006.01) |
| E06B 9/78 | (2006.01) |
| F16H 7/08 | (2006.01) |

(52) U.S. Cl.
CPC . *E06B 9/76* (2013.01); *E06B 9/78* (2013.01); *F16H 7/08* (2013.01); *E06B 2009/785* (2013.01); *Y10T 74/1884* (2015.01)

(58) Field of Classification Search
CPC ...... E06B 9/76; E06B 9/78; E06B 2009/785; F16H 7/08; Y10T 74/1884
See application file for complete search history.

(56) References Cited

U.S. PATENT DOCUMENTS

| 66,094 | A |   | 6/1867 | Pandler |
| 213,917 | A |   | 4/1879 | Mathers |
| 556,255 | A | * | 3/1896 | Darling ..................... E06B 9/42 160/256 |
| 1,091,103 | A |   | 3/1914 | Wooton |
| 2,413,471 | A | * | 12/1946 | Sorrentino .................... 160/133 |
| 2,564,831 | A |   | 8/1951 | Butkus |
| 4,481,998 | A |   | 11/1984 | Strandberg et al. |
| 4,673,019 | A |   | 6/1987 | Silverthorne et al. |
| 7,114,544 | B2 |   | 10/2006 | Rice et al. |
| 7,931,069 | B2 | * | 4/2011 | Cannaverde et al. .... 160/173 R |
| 8,499,814 | B2 | * | 8/2013 | Ng ............................. 160/173 R |
| 8,763,675 | B2 | * | 7/2014 | Zhu ............................... 160/321 |
| 8,935,832 | B2 | * | 1/2015 | Chuang ....................... 24/115 G |
| 2006/0048907 | A1 |   | 3/2006 | Rice et al. |
| 2011/0035908 | A1 | * | 2/2011 | Chen ............................ 24/116 A |
| 2011/0036517 | A1 | * | 2/2011 | Chen ............................. 160/319 |
| 2012/0255686 | A1 | * | 10/2012 | Huang ........................ 160/293.1 |

FOREIGN PATENT DOCUMENTS

TW         M373190        *  2/2010

* cited by examiner

*Primary Examiner* — Katherine Mitchell
*Assistant Examiner* — Abe Massad
(74) *Attorney, Agent, or Firm* — Buchanan Ingersoll & Rooney PC

(57) ABSTRACT

A tension device for a corded-loop drive system has a base with a sprocket on the base such that the cord loop travels over the sprocket. At least one resilient finger has a first end attached to the base and a free end. Each finger is sized and positioned to engage the cord loop when the tension device is not properly mounted to a wall or window frame and prevent movement of the cord loop around the sprocket. There is a hole in the finger through which a screw passes. When the base is placed on a mounting surface and the screw is driven into the mounting surface, the free end of the finger will have moved from the first position to a second position away from the cord so that the cord loop may move around the sprocket and the window covering can be fully raised and fully lowered.

19 Claims, 5 Drawing Sheets

TENSION DEVICE FOR LOOPED-CORD SYSTEM

FIELD OF THE INVENTION

The present invention relates generally to tension devices used on looped-cord mechanisms of the type commonly used in window coverings and treatments, such as blinds, curtains, and the like.

BACKGROUND OF THE INVENTION

Many types of architectural coverings and treatments, such as Venetian blinds, cellular or pleated shades, and variants of these utilize an actuator known as a looped-cord or continuous looped-cord. Such cords are distinct from the basic pull cord used in many window coverings in that the looped-cord does not connect directly to the shade material. Instead the top of the loop is on a sprocket that engages a clutch on a rotating shaft in a headrail of the shade or engages the roller of a roller shade. Movement of the looped-cord in a first direction raises the shade and movement of the looped cord in the opposite direction lowers the shade. The cord loop may be made at different lengths than the shade and may be configured to make multiple circulations during opening and closing of the shade. The cord may be made of polyester or other material used in cords for window coverings. Often a beaded cord is used in a looped-cord drive.

The benefits of a looped-cord system versus a standard pull cord system are that the exposed cord loop remains at a constant length whether the shade is open or closed (avoiding the problem of stowing the long exposed pull cord when the shade is opened). Moreover, a looped-cord system also provides a mechanical advantage to raise relatively large, heavy shades with reasonable cord forces.

However, looped-cord systems also have a significant disadvantage. The cord loop may hang freely along a side of the shade which is operated by the looped-cord system. Many looped-cord systems have been installed such that the cord loop extends to or below the bottom of the window and the cord is easily grasped by young children. A dangling cord loop has proved to be a health hazard to young children. In recent years, cases of death or injury have been documented in which a small child has become entangled in a cord loop and has choked or become asphyxiated when the cord became wrapped around the child's neck and constricted the child's airway. All of these cord loop incidents involved looped-cord systems which did not have a cord tensioner or the cord tensioner was not attached to the wall and the cord loop hung freely.

Current safety regulations in the United States require that looped-cord style shades be supplied with a tensioner. A tensioner, also called a tension device, typically includes a two-piece housing with a through passage for a cord and is configured for attachment to a wall or other fixed structure. A properly installed tensioner pulls the cord loop downward away from the headrail so that the cord is taut when used to raise and lower a blind and when not in use. When the cord is taut it should be difficult to spread the two runs of the cord loop apart a sufficient distance for a child's head to fit within the loop, thereby preventing injury and possibly death. However, some tensioners have been installed with a dangerous amount of slack in the cord loop and some tensioners have not been installed at all.

To minimize the limitations of known tensioners, improved tensioner designs have been developed. One design includes a tensioning spring between a cord contacting member and a tensioner mounting body. This improved design allows the tensioner to be mounted with the cord loop fully taut and the tensioning spring partially loaded. The pre-loaded spring holds the cord loop taut while not in operation, thus preventing a young child from spreading the cord loop wide enough to pass his or her head through the loop. During operation of the looped-cord system, an adult operating the cord will be able to overcome the remainder of the spring loading and easily pull the cord to open or close the shade. However, even this improved tensioner design has not fully addressed the safety concerns associated with the looped-cord systems because there is no requirement that the tensioner be installed for the shade to be operable. The end user may elect not to mount the tensioner to the wall or other non-moveable structure and instead use the tensioner as a weight at the bottom of the cord loop. Although new tensioner designs include safety improvements, if the tensioner is not mounted to the wall, as discussed above, it will not prevent the opening of the cord loop to a dangerous width.

Therefore, a need exists for a tension device for a looped-cord system which will be locked onto the cord until the tension device is properly installed. While the tension device is locked onto the cord the window covering cannot be fully raised and lowered.

BRIEF SUMMARY OF THE INVENTION

I provide a tension device for a loop drive system having a cord loop. The tension device can be configured for use with a beaded cord loop in which the cord loop has a series of beads and a space between each pair of adjacent beads. The tension device has a base with a sprocket on the base such that the cord loop travels over the sprocket. At least one resilient finger is positioned adjacent the sprocket. The finger has a first end attached to the base and a free end opposite the base. The finger is sized and positioned so that the free end will engage the sprocket or the cord loop when the finger is in a first position and prevent movement of the cord loop around the sprocket. There is a hole in the finger through which a screw passes. When the base is placed on a mounting surface and the screw is driven into the mounting surface, the free end of the finger will have moved from the first position to a second position at which the finger no longer engages the sprocket or the cord loop. When the finger is in this second position the cord loop may move around the sprocket and the window covering can be fully raised and fully lowered.

While I prefer to use the tension device with a beaded cord loop, a polyester cord, or similar cord which is not beaded may be used in place of the beaded cord loop.

I prefer to provide a cover which fits over the sprocket and resilient finger and is attached to the base.

I further prefer to make the base, sprocket and cover of plastic.

I also may provide a crank which is connected to the sprocket in the tension device and can be used to operate the cord loop.

I further prefer to provide a shroud around the cord loop.

Other objects and features of my tension device and the cored-loop drive containing that tension device will become apparent from a description of certain present preferred embodiments thereof.

DETAILED DESCRIPTION OF THE PREFERRED EMBODIMENTS

Figure 1:
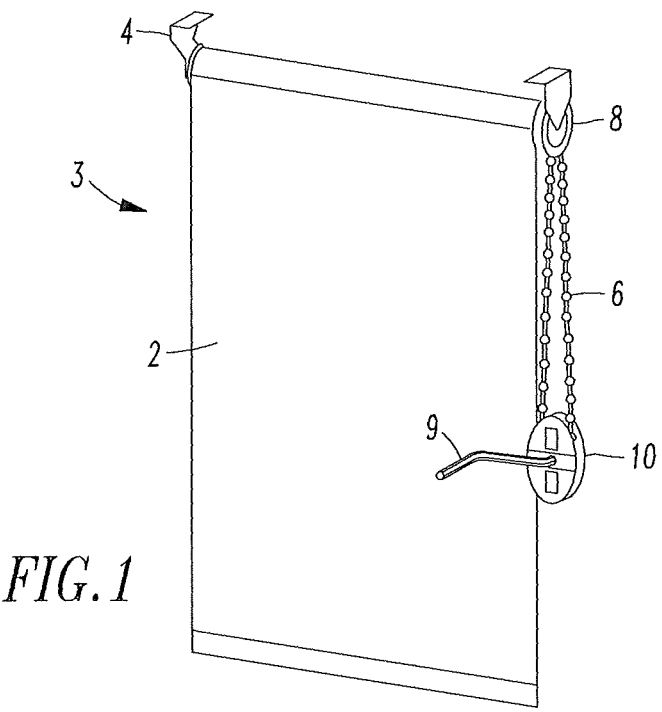
FIG. 1 is a front perspective view of a window covering having a beaded cord loop drive and tension device in of the type shown in FIGS. 3 through 5.

Referring to FIG. 1, a window covering 1 is operated by a looped-cord system 3. The window covering 1 includes a window covering material 2 extending from a roller. Brackets 4 are provided to mount the window covering 1 above a window or other opening (not shown) such that the window covering material 2 hangs vertically to cover the window. A cord loop 6 extends from a drive unit 8 to which the roller is attached. The top of the cord loop runs over a sprocket (not shown) in the drive unit 8. The bottom of the cord loop runs around a second sprocket (shown in FIG. 4) within a present preferred embodiment of my tension device 10. There may be a clutch (not shown) in the drive unit 8 which connects the sprocket to the roller. Cord loop 6 may be a different length than the length of the fully lowered window covering material 2. The tension device 10 is mounted to a wall or other non-movable structure adjacent to shade 1. A crank 9 may be provided to turn the sprocket in the tension device and thereby move the cord loop. The window covering shown in FIG. 1 includes a constant length of exposed cord loop 6 (avoiding the problem of stowing a long exposed cord found in pull-cord style window treatment designs while the treatment is open). Moreover, cord loop 6 and drive unit 8 may cooperatively provide a mechanical advantage to raise relatively large, heavy shades with reasonable force on the cord loop.

A major disadvantage of the looped-cord drive systems in the prior art is that the window covering can be fully raised and fully lowered when the tension device is not attached to the wall. However, the loop-cord system and tension device here disclosed do not suffer from that disadvantage because the cord will not move through the tension device until the tension device is mounted on a wall or window frame.

Figure 2:
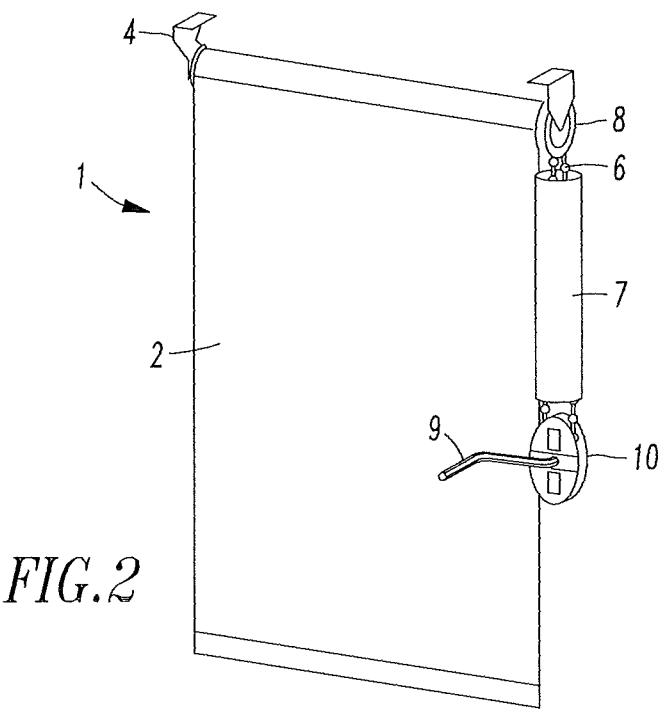
FIG. 2 is a perspective view similar to FIG. 1 of a second present preferred cord loop drive having a shroud around the cord loop and a crank attached to the tension device.

Referring to FIG. 2 I provide a looped cord drive system similar to that shown in FIG. 1 wherein common elements have the same reference numbers. In this embodiment a shroud 7 surrounds the cord loop 6.

Figure 3:
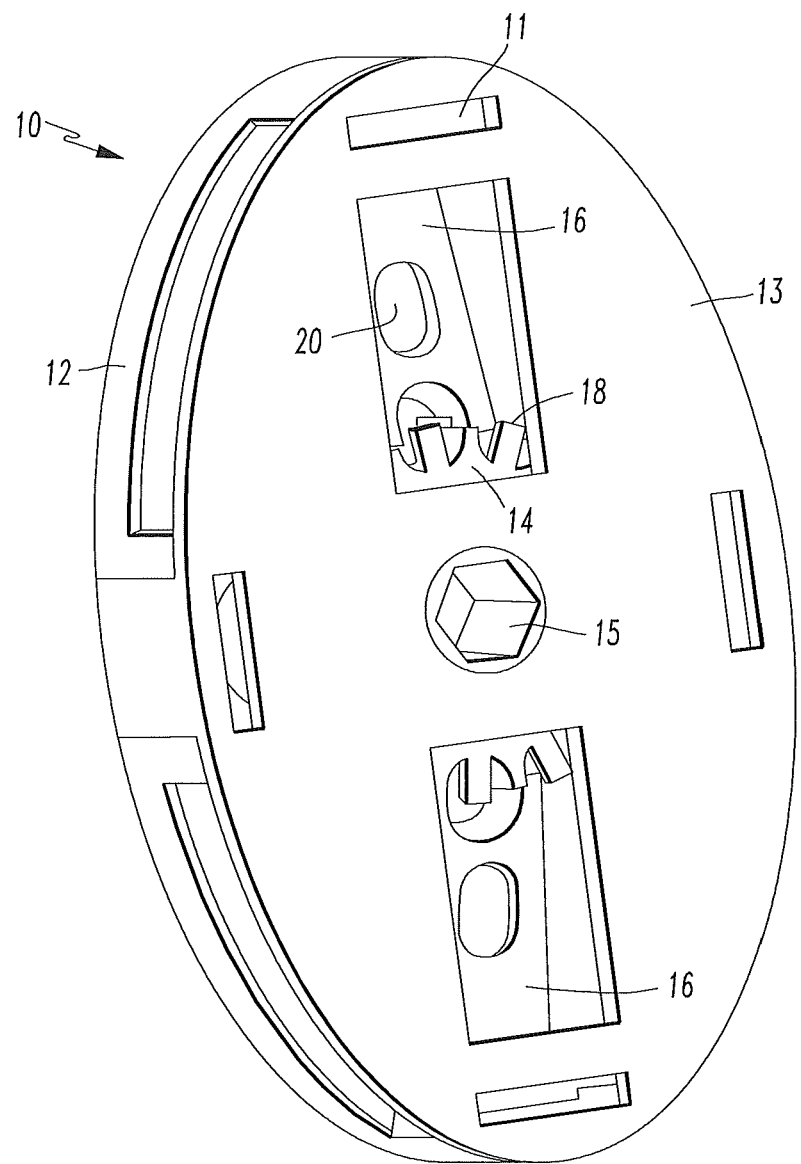
FIG. 3 is a perspective front view of a present preferred embodiment of my tension device.
Figure 4:
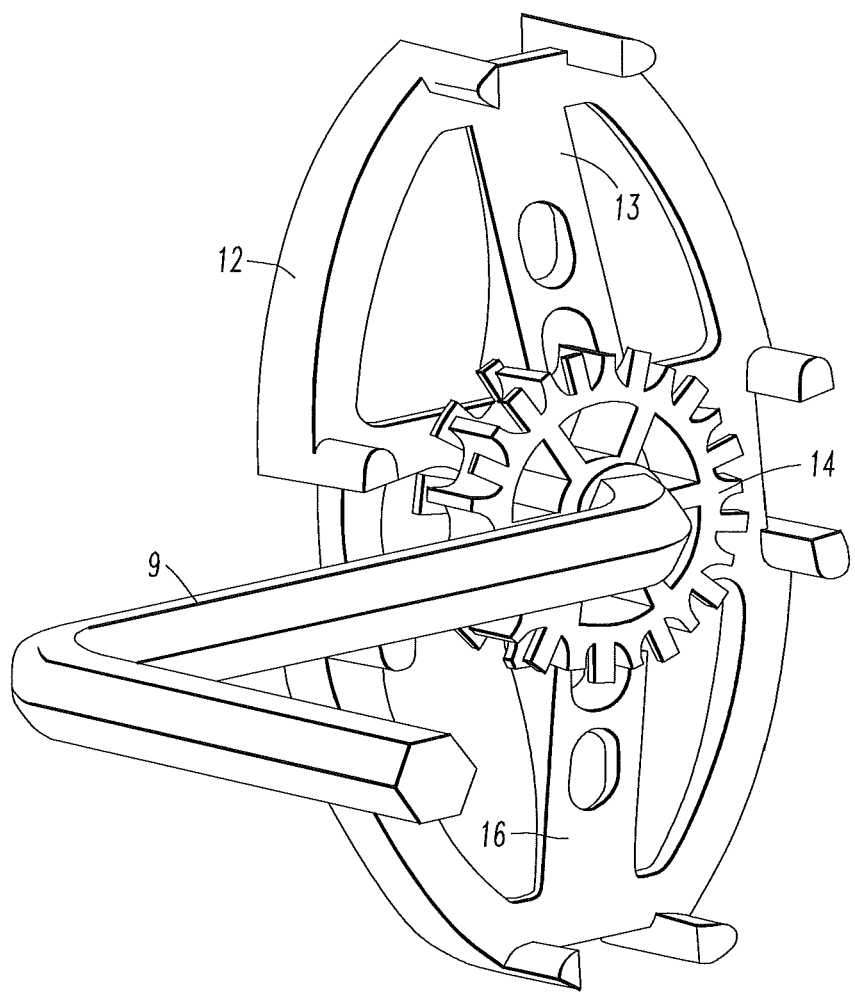
FIG. 4 is a front perspective view of the tension device shown in FIG. 3 with the cover removed and the resilient fingers are in a first position engaging the sprocket.
Figure 5:
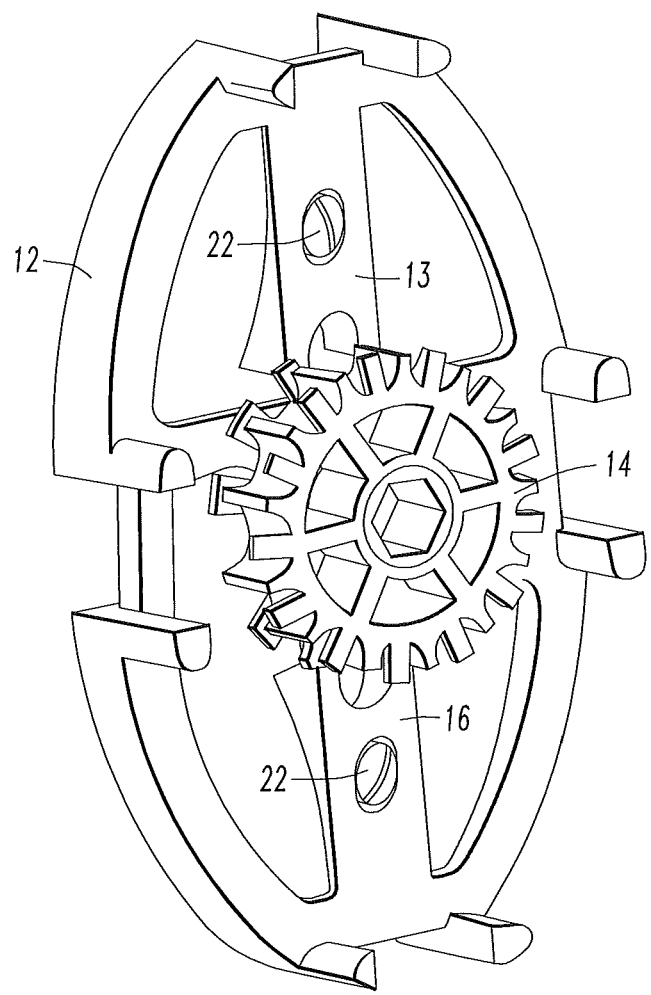
FIG. 5 is a perspective front perspective view similar to FIG. 4 in which the resilient fingers are in a second position disengaged from the sprocket.

Referring to FIGS. 3, 4 and 5 a first present preferred embodiment of my tension device 10 has a base 12 and cover 13. Tabs 11 may be provided to attach the cover 13 to the base 12. A sprocket 14 is mounted on the base 12. I prefer to make the base, sprocket and cover from a suitable plastic such as polycarbonate. The sprocket may have a hex shaped opening 15 to receive a crank. The lower end of a cord loop 6 travels around the sprocket when the window covering material is being raised and lowered. A pair of resilient fingers 16 extends upward from the base such that the free end 18 of each finger engages the sprocket 16 when the free end 18 is in a first position shown in FIG. 4. The free end 18 of the finger may have a recess that is sized and positioned so that a portion of a bead of a corded bead loop will be in the recess when the free end 18 of the resilient finger 16 is in the first position. This can be seen most clearly in the embodiment shown in FIGS. 6 and 7. Engagement of the free ends of the fingers with the sprocket and or the beaded cord loop 6 prevents movement of the cord loop around the sprocket 14. When the free end 18 of one or both resilient fingers 16 is in this first position one cannot fully raise or fully lower the shade material. A mounting hole 20 is provided in each resilient finger 16 which receives a mounting screw 22, shown in FIG. 5. The tension device 10 is mounted to a window frame or wall by mounting screws 22, such that when this screw is fully seated the resilient finger will have moved to the second position, or unlocked position shown in FIG. 5. Then the free end 18 of the resilient fingers are no longer engaging the sprocket or the beads of a beaded cord loop, the cord loop 6 is free to move around the sprocket 14. When the resilient fingers are in the second position anyone can use the cord loop to fully raise and fully lower the window covering material. Consequently, for any window covering which is equipped with the present tension device to operate properly, the tension device must be mounted to a wall or window frame. When the tension device is properly mounted there is little risk that a small child will become entangled in the cord loop.

The embodiment of FIGS. 3 through 5 could be used with a beaded cord loop or a non-beaded cord loop such as a polyester core loop. If a polyester cord loop is used a tooth, teeth or serrations may be provided on the free end of the resilient fingers that will bite the cord when the fingers are in the first position.

Figure 6:
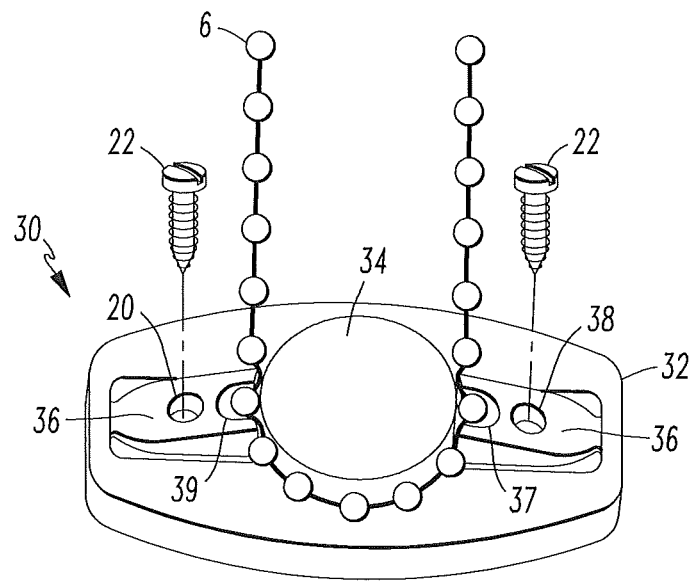
FIG. 6 is a perspective front view of a second present preferred embodiment of my tension device with the cover removed and the resilient fingers are in a first position engaging the beaded cord loop.
Figure 7:
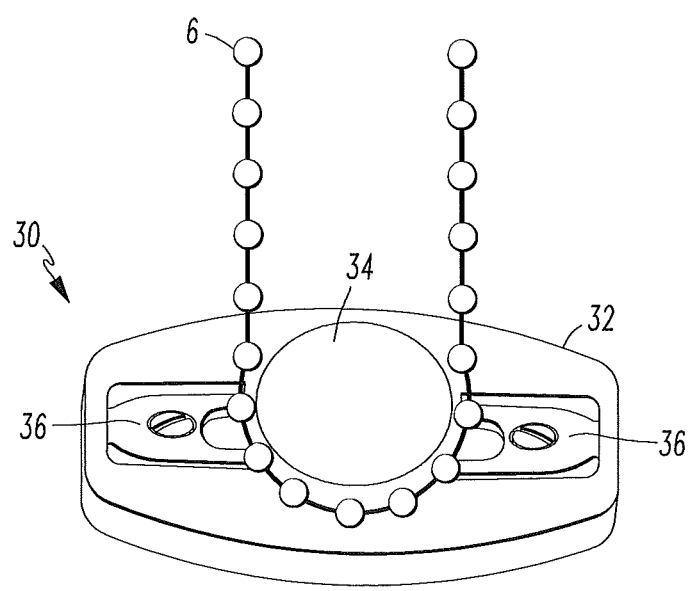
FIG. 7 is a perspective front perspective view similar to FIG. 6 with the resilient fingers are in a second position disengaged from the cord loop.

A second present preferred embodiment of my tension device 30 is shown in FIGS. 6 and 7. This embodiment is similar to the first embodiment but is intended for use with a beaded cord. As in the first embodiment a sprocket 34 is mounted on the base 32 and covered by cover 33. The lower end of a cord loop 6 travels around the sprocket when the window covering material is being raised and lowered. A pair of resilient fingers 36 extends upward from the base such that the free end 38 of the finger engages the cord loop such that a bead 37 is within a recess 39 in each finger. When the free end 38 is in this first position or locked position shown in FIG. 6 in the cord loop 6 cannot move around the sprocket 34 and one cannot fully raise or fully lower the shade material. A mounting hole 39 is provided in each resilient finger 36 which receives a mounting screw 22, shown in FIG. 7. The tension device 30 is mounted to a window frame or wall by mounting screw 22 or other fastener, such that when this screw is fully seated the resilient finger will have moved to the second position, or unlocked position shown in FIG. 7. The cord loop 6 is then free to move around the sprocket 34 to fully raise or fully lower the shade material. While I prefer to use a wood screw to attach the tension device to the wall, a machine screw, nail or rivet could be used in some situations.

If desired pockets (not shown) can be provided on the sprocket which are each sized and shaped to receive a portion of a bead in the beaded cord loop.

The tension device can be mounted so that the pair of fingers is on a vertical axis as shown in FIGS. 1 and 2. Or the tension device can be mounted so that the fingers are on the horizontal axis as shown in FIG. 7.

Although I have described the fingers as resilient it should be understood that resilient in this context means that the finger is movable from a first position to a second position and is biased toward the first position. If desired a spring and hinge could be used to achieve this bias and the finger may be made of a hard inflexible material.

While I have shown a pair of resilient fingers in each of the preferred embodiments a single resilient finger or more than two resilient fingers could be used.

While I have shown certain present preferred embodiments of my tension device for looped-cords and a looped cord system containing this tension device it should be distinctly understood that the invention is not limited thereto but may be variously embodiment within the scope of the following claims.

I claim:

1. A tension device for a loop drive system having a beaded cord loop comprising:
    a base positionable on a mounting surface;
    a sprocket around which the beaded cord loop travels, the sprocket rotatably attached to the base;
    a first resilient finger positioned adjacent the sprocket and a second resilient finger positioned adjacent the sprocket, the first resilient finger being spaced apart from the second resilient finger, the first resilient finger being adjacent a first side of the sprocket and the second resilient finger being adjacent a second side of the sprocket that is opposite the first side of the sprocket, the first resilient finger and the second resilient finger each having a first end attached to the base and a second end opposite the first end having a recess,
    a first fastener passable through a first hole in the first resilient finger;
    a second fastener passable through a second hole in the second resilient finger;
    the first resilient finger configured to be moveable relative to the sprocket from a first position to a second position when the first fastener is passed through the first hole as the first fastener is driven into the mounting surface for attachment of the base to the mounting surface, the first position of the first resilient finger being a position in which a first bead of the beaded cord loop is received within the recess of the first resilient finger to prevent rotatable motion of the sprocket and prevent rotatable motion of the beaded cord about the sprocket and the second position of the first resilient finger being a position in which the recess of the first resilient finger is positioned away from the first bead so that the first bead is no longer retained within the recess such that the beaded cord is moveable about the sprocket and the sprocket is rotatable; and
    the second resilient finger configured to be moveable relative to the sprocket from a first position to a second position when the second fastener is passed through the second hole as the second fastener is driven into the mounting surface for attachment of the base to the mounting surface, the first position of the second resilient finger being a position in which a second bead of the beaded cord loop is received within the recess of the second resilient finger to prevent rotatable motion of the sprocket and prevent rotatable motion of the beaded cord about the sprocket and the second position of the second resilient finger being a position in which the recess of the second resilient finger is positioned away from the second bead so that the second bead is no longer retained within the recess such that the beaded cord is moveable about the sprocket and the sprocket is rotatable.

2. The tension device of claim 1 also comprising a cover attached to the base, the cover covering the first resilient finger, the second resilient finger, and the sprocket.

3. The tension device of claim 2 wherein the base, cover, the first resilient finger, and the second resilient finger are plastic.

4. The tension device of claim 1 wherein the first fastener is a wood screw, a machine screw, a nail or a rivet and the second fastener is a wood screw, a machine screw, a nail or a rivet.

5. The tension device of claim 1, comprising a crank attached to the sprocket such that motion of the crank drives rotation of the sprocket when the first resilient finger is in the second position of the first resilient finger and the second resilient finger is in the second position of the second resilient finger.

6. A loop drive for a window covering comprising
    a drive unit having a first sprocket;
    a beaded cord loop on the first sprocket, and
    a tension device comprised of:
        a base positionable on a mounting surface,
        a second sprocket rotatably attached to the base,
        a first resilient finger positioned adjacent the second sprocket and a second resilient finger positioned adjacent the second sprocket, the first resilient finger being spaced apart from the second resilient finger, the first resilient finger and the second resilient finger each having a first end attached to the base and a second end opposite the first end having a recess,
        the first resilient finger being moveable relative to the second sprocket from a first position to a second position when a first fastener is passed through the first resilient finger as the first fastener is driven into the mounting surface for attachment of the base to the mounting surface, the first position of the first resilient finger being a position in which a first bead of the beaded cord loop is received within the recess of the first resilient finger to help prevent rotatable motion of the second sprocket and help prevent rotatable motion of the beaded cord about the second sprocket and the second position of the first resilient finger being a position in which the recess is positioned away from the first bead such that the beaded cord is moveable about the second sprocket and the second sprocket is rotatable, and
        the second resilient finger being moveable relative to the second sprocket from a first position to a second position when a second fastener is passed through the second resilient finger as the second fastener is driven into the mounting surface for attachment of the base to the mounting surface, the first position of the second resilient finger being a position in which a second bead of the beaded cord loop is received within the recess of the second resilient finger to help prevent rotatable motion of the second sprocket and help prevent rotatable motion of the beaded cord about the second sprocket and the second position of the second resilient finger being a position in which the recess is positioned away from the second bead such that the beaded cord is moveable about the second sprocket and the second sprocket is rotatable.

7. The loop drive of claim 6 also comprising a shroud around the beaded cord loop.

8. The loop drive of claim 6 wherein the first fastener is a wood screw, a machine screw, a nail or a rivet and the second fastener is a wood screw, machine screw, nail or rivet.

9. The loop drive of claim 6, comprising a crank attached to the second sprocket such that motion of the crank drives rotation of the second sprocket when the first resilient finger is in the second position of the first resilient finger and the second resilient finger is in the second position of the second resilient finger.

10. A tension device for a loop drive system comprising:
a base positionable on a mounting surface;
a sprocket around which a cord loop is moveable, the sprocket rotatably attached to the base;
a first finger positioned adjacent the sprocket and a second finger positioned adjacent the sprocket, the first finger being spaced apart from the second finger, the first finger and the second finger each having a first end attached to the base and a second end opposite the first end having a recess, the first finger positioned adjacent a first side of the sprocket and the second finger positioned adjacent a second side of the sprocket that is opposite the first side of the sprocket;
the first finger configured to be moveable relative to the sprocket from a first position to a second position when a first fastener is passed through a hole in the first finger as the first fastener is driven into the mounting surface for attachment of the base to the mounting surface, the first position of the first finger being a position in which a first bead of the cord loop is received within the recess of the first finger to prevent rotatable motion of the sprocket and prevent rotatable motion of the cord loop about the sprocket and the second position of the first finger being a position in which the recess is positioned away from the first bead such that the cord loop is moveable about the sprocket and the sprocket is rotatable; and
the second finger configured to be moveable relative to the sprocket from a first position to a second position when a second fastener is passed through the second finger as the second fastener is driven into the mounting surface for attachment of the base to the mounting surface, the first position of the second finger being a position in which a second bead of the cord loop is received within the recess of the second finger to prevent rotatable motion of the sprocket and prevent rotatable motion of the cord loop about the sprocket and the second position of the second finger being a position in which the recess is positioned away from the second bead such that the cord loop is moveable about the sprocket and the sprocket is rotatable.

11. The tension device of claim 10 also comprising a cover attached to the base and covering the first finger, the second finger, and the sprocket.

12. The tension device of claim 11 wherein the base, the cover the first finger and the second finger are plastic.

13. The tension device of claim 10 wherein the first fastener is a wood screw, a machine screw, a nail or a rivet.

14. The tension device of claim 11, comprising a crank attachable to the sprocket and extending away from the cover such that motion of the crank drives rotation of the sprocket when the first finger is in the second position of the first finger and the second finger is in the second position of the second finger.

15. A loop drive for a window covering comprising
a drive unit having a first sprocket;
a cord loop on the first sprocket, and
a tension device comprised of:
a base mountable on a mounting surface;
a second sprocket attached to the base around which the cord loop travels;
a first finger positioned adjacent the second sprocket and a second finger positioned adjacent the second sprocket, the first finger being spaced apart from the second finger, the first finger and the second finger each having a first end attached to the base and a second end opposite the first end having a recess, the first finger positioned adjacent a first side of the second sprocket and the second finger positioned adjacent a second side of the second sprocket that is opposite the first side of the second sprocket;
the first finger attached to the base such that the first finger is moveable relative to the second sprocket from a first position to a second position when a first fastener is passed through a hole in the first finger as the first fastener is driven into the mounting surface for attachment of the base to the mounting surface, the first position of the first finger being a position in which a first bead of the cord loop is received within the recess of the first finger to prevent rotatable motion of the second sprocket and prevent rotatable motion of the cord loop about the second sprocket and the second position of the first finger being a position in which the recess is positioned away from the first bead such that the cord loop is moveable about the second sprocket and the second sprocket is rotatable; and
the second finger attached to the base such that the second finger is moveable relative to the second sprocket from a first position to a second position when a second fastener is passed through the second finger as the second fastener is driven into the mounting surface for attachment of the base to the mounting surface, the first position of the second finger being a position in which a second bead of the cord loop is received within the recess of the second finger to prevent rotatable motion of the second sprocket and prevent rotatable motion of the cord loop about the second sprocket and the second position of the second finger being a position in which the recess is positioned away from the second bead such that the cord loop is moveable about the second sprocket and the second sprocket is rotatable.

16. The loop drive of claim 15 also comprising a shroud around the cord loop.

17. The loop drive of claim 15 wherein the fastener is a wood screw, machine screw, nail or rivet.

18. The loop drive of claim 15, comprising a cover attached to the base, the cover covering the second sprocket, the first finger, and the second finger.

19. The loop drive of claim 18, comprising a crank that extends out of the cover and is attachable to the sprocket such that motion of the crank drives rotation of the second sprocket when the first finger is in the second position of the first finger and the second finger is in the second position of the second finger.

* * * * *